United States Patent Office 3,475,489
Patented Oct. 28, 1969

3,475,489
METHOD FOR PREPARING AN ALIPHATIC α-AMINO-CARBOXYLIC ACID FROM THE CORRESPONDING α-CHLOROCARBOXYLIC ACID AND AMMONIA
Johannes de Graaf and Albert Blaauw, Hengelo, Netherlands, assignors to N.V. Koninklijke Nederlandsche Zoutindustrie, Hengelo, Netherlands
No Drawing. Filed Nov. 22, 1966, Ser. No. 596,105
Int. Cl. C07c 99/00
U.S. Cl. 260—534                                     3 Claims

ABSTRACT OF THE DISCLOSURE

A single stage process for preparing an aliphatic aminocarboxylic acid from the corresponding α-chlorocarboxylic acid or salt thereof and ammonia in an aqueous medium in the presence of hexamethylenetetramine. During the course of the reaction of α-chlorocarboxylic acid, the ammonium salt thereof, an alkali metal salt thereof, ammonia, ammonium hydroxide and/or alkali metal hydroxide are added to the aqueous medium in such a combination and in such relative amounts, that the added reaction components together correspond to substantially equal molar quantities of α-chlorocarboxylic acid, ammonia and alkali metal hydroxide, said aqueous hexamethylenetetramine containing medium also containing ammonium ions in a molar amount of at least one tenth of the molar amount of the α-chlorocarboxylic acid or salt thereof to be converted.

---

This invention relates to an improved method for the preparation of aliphatic α-aminocarboxylic acid from the corresponding α-chlorocarboxylic acid or salt thereof and ammonia in an aqueous medium, and more particularly, relates to such method in which α-aminocarboxylic acid and alkali metal chloride is obtained as reaction products in a single step.

Aliphatic α-aminocarboxylic acids may be prepared in an aqueous medium from the corresponding α-chlorocarboxylic acids and ammonia in the presence of hexamethylenetetramine which is involved in intermediary reactions but is found again in the reaction product and can be recovered therefrom.

This is known from U.S. Patent 3,215,736 to Henry M. Guinot. Said patent mentions (column 3, lines 18–21) that it is very undesirable to use the alkali metal salts of the acids and, actually, according to the examples, the ammonium salts of the chlorocarboxylic acids or the acids themselves are used as the starting products. In both cases, equimolar amounts of aminocarboxylic acid and ammonium chloride are formed in the reaction and, in fact, two moles of ammonia are used per mole of chlorocarboxylic acid, namely one for the amination reaction and one for neutralizing the hydrochloric acid formed in the reaction. (When using the ammonium salt of the chlorocarboxylic acid, one mole of ammonia is derived from said salt.)

When it is desired to recover the ammonia combined as ammonium chloride, one may add sodium hydroxide to the mother liquor obtained after precipitation and separation of the aminocarboxylic acid formed, and expel the ammonia by heating, in accordance with Example 4 of the cited patent application. Along this detour an "indirect neutralization" of the hydrochloric acid to sodium chloride is obtained, and apart from losses, ammonia consumption is limited to one mole per mole of converted chlorocarboxylic acid.

It has now been found that the neutralization of the hydrochloric acid formed in the reaction to alkali chloride can be accomplished during the reaction and without a special step for expelling ammonia in that, in the reaction, only one mole of ammonia per mole of chlorocarboxylic acid is consumed and, in that, during the course of the reaction, alkali metal hydroxide is added or in that the chlorocarboxylic acid is entirely or in part used in the form of an alkali metal salt. However, a condition for a good progress of the reaction is that ammonium ions are present since otherwise the bad results, warned against in the U.S. Patent 3,215,736 are obtained.

Accordingly, the invention relates to a method for preparing an aliphatic α-aminocarboxylic acid from the corresponding α-chlorocarboxylic acid or a salt thereof and ammonia in an aqueous medium in the presence of hexamethylenetetramine and aims at carrying out this method so as to obtain α-aminocarboxylic acid and alkali metal 3-chloride as reaction products in a single step. According to the invention, in the course of the reaction α-chlorocarboxylic acid, the ammonium salt thereof, an alkali metal salt thereof, ammonia, ammonium hydroxide and/or alkali metal hydroxide are added to the aqueous medium in such a combination and in such relative amounts, that the added reaction components together correspond to substantially equal molar quantities of α-chlorocarboxylic acid, ammonia and alkali metal hydroxide, said aqueous hexamethylenetetramine containing medium also containing ammonium ions in a molar amount of at least one tenth of the molar amount of the α-chlorocarboxylic acid or salt thereof to be converted.

Better results are obtained, in particular as regards the yield in relation to the reaction velocity, when the molar amount of ammonium ions present in the reaction medium is at least one fifth, and in the average preferably at least one third, of the molar amount of the chlorocarboxylic acid or salt thereof to be converted.

In a preferred embodiment to be discussed hereinafter, first an additional amount of ammonium chloride is formed in the course of the reaction, which additional amount is decomposed, or better is converted into alkali metal chloride by reaction with alkali metal hydroxide, in a later stage, whereby so to say ammonia is made available for the amination in situ. In view hereof, there is sense in speaking of the average molar amount of ammonium ions in the medium.

It is possible to maintain the equimolarity between the three reaction components (or the compounds to be used instead thereof) during the course of the reaction but in the preferred embodiment of the method according to the invention first one quarter to one half of the chlorocarboxylic acid to be converted and ammonia are reacted with each other in a molar ratio of about 1:2, whereafter the reaction is proceeded with about one half of the chlorocarboxylic acid and alkali metal hydroxide, also in a molar ratio of about 1:2, followed by a completion of the reaction with the possibly remaining amount of the chlorocarboxylic acid to be converted and ammonia, again in a molar ratio of about 1:2.

In this case too, the chlorocarboxylic acid can entirely or partly be used in the form of its salts, namely first as the ammonium salt, then as the alkali metal and finally again as the ammonium salt for the possibly remaining part which in accordance with the above, is not more than one quarter of the total amount to be converted.

The aminocarboxylic acid formed may be recovered from the reaction liquid by, for example, precipitation or crystallization. A simple manner of isolation which is well suited to continuous or successive batches processing, is obtained when a substantially equimolar crystal mixture of aminocarboxylic acid and alkali metal chloride is separated from the reaction liquid, while at least the greater part of the remaining mother liquor is returned to the reaction zone.

Initially, and this applies to a continuous as well as to a batch process, the crystal mixture obtained will not contain equimolar quantities of aminocarboxylic acid and alkali metal chloride, unless one starts with a previously prepared reaction mixture having a composition substantially corresponding to the mother liquor remaining later on in the crystallization. However, after a short time or after one or a few batches, respectively, a "stationary" state is reached wherein both compounds do crystallize in substantially equimolar amounts.

Preferably, the crystallization of both aminocarboxylic acid and alkali metal chloride is effected by cooling and/or removal of part of the water contained in the reaction liquid under a reduced pressure. The number of operations to which the hexamethylenetetramine containing liquid is exposed, and thereby the decomposition and discoloration phenomena, are limited to a minimum. As a matter of fact, apart from the reaction there are only a cooling or vacuum evaporation step (which may already be effected in part during the reaction) and a filtering or centrifuging step, whereafter the mother liquor is directly recycled to the reactor.

In this connection "directly" means that the mother liquor is not subjected to further conversion or separation steps. Of course, it may be desirable to purge a certain part of the mother liquor (in which case hexamethylenetetramine or formaldehyde and ammonia have to be added as a supplement), to effect a certain concentration by vacuum evaporation or to preheat the liquor and/or to premix it with reaction components. However, such operations do not have an essential effect on the decomposition and discoloration in the hexamethylenetetramine circuit.

For separating the recovered crystal mixture of aminocarboxylic acid and alkali metal chloride, first the mixture can be dissolved in water and then the aminocarboxylic acid can be recovered by precipitation or fractional crystallization. Particular advantageous results are obtained when (1) the crystal mixture is extracted at a raised temperature with mother liquor obtained in a preceding aminocarboxylic acid crystallization, effected at a lower temperature, and concentrated to some extent before, during or after the extraction, the amount of said mother liquor being such that substantially the total quantity of aminocarboxylic acid contained in said crystal mixture enters into solution but that the alkali metal chloride substantially remains undissolved, (2) the solid alkali metal chloride is separated from the solution, (3) the solution is cooled to such a temperature and, the case being, is diluted with such an amount of water that the quantity of aminocarboxylic acid dissolved in the extraction step substantially crystallizes but that alkali metal chloride present in the solution substantially completely remains dissolved, and (4) the crystallized aminocarboxylic acid is separated from the mother liquor which is used for a subsequent extraction of the crystal mixture.

A similar separation, however, in the form of a fractional crystallization, can be carried out with the reaction liquid itself, but is more difficult to control in view of the other components present in the liquid, notably the hexamethylenetetramine and the compound providing the required ammonium ions, for which particularly ammonium chloride comes into consideration. Therefore, and also in view of the purity of the aminocarboxylic acid to be recovered, the joint crystallization of aminocarboxylic acid and alkali metal chloride described hereinbefore, usually followed by a separation of these two compounds, is preferred.

The Examples I and II elucidate the preparation while Example III relates to an embodiment of separating an equimolar crystal mixture of alkali metal chloride and aminocarboxylic acid.

EXAMPLE I

To a solution consisting of 52.5 g. of hexamethylenetetramine, 42.5 g. of ammonium chloride and 180 g. of water, half of a solution of 238 g. of monochloroacetic acid in 82 g. of water was added dropwise at 65–70° C. in the course of about 1 hour, while the pH was maintained at 6.5–7.0 by introducing gaseous ammonia. Thereafter, the other half of the monochloroacetic acid solution was added at the same temperature and the same pH while simultaneously adding a solution of 100 g. of sodium hydroxide in 234 g. of water, also in the course of about 1 hour.

After the reaction product was allowed to complete the reaction during 1 hour at 65–70° C., the product was diluted with water to 2000 g. and was analyzed. 175.5 g. of aminoacetic acid appeared to have been formed, corresponding to a yield of 93.5%, calculated on the amount of monochloroacetic acid used.

EXAMPLE II

To a solution consisting of 117.1 g. of aminoacetic acid, 85 g. of ammonium chloride, 98.6 g. of sodium chloride, 52.5 g. of hexamethylenetetramine and 370 g. of water, a solution of 294 g. of the sodium salt of monochloroacetic acid in 380 g. of water was added at a temperature of about 70° C. in the course of about 2 hours, while the pH was kept at 6.5–7.0 by introducing gaseous ammonia.

Thereafter the temperature of the reaction mixture was kept at 70° during still another hour, whereafter the total weight of the mixture was brought to 1040 g. by removal of water under vacuum. The crystal mass obtained after cooling was separated from the mother liquor by centrifugation and was dried.

To the mother liquor (726 g.) a solution of 294 g. of sodium monochloroacetate in 380 g. of water was added in the same manner as described hereinbefore, and the further processing also took place in the same manner.

The mother liquor (716 g.) of the second batch was used for a third batch whereafter 694.5 g. of mother liquor remained, which contained 128.2 g. of aminoacetic acid, 115.9 g. of chlorine ion, 31.6 g. of ammonium ion, 39.5 g. of sodium ion and 42.8 g. of hexamethylenetetramine.

The crystal mixtures of the three batches contained the following quantities of solids:

| | Aminoacetic acid, grams | Sodium chloride, grams |
|---|---|---|
| Crystal mixture of batch— | | |
| 1 | 164.0 | 141.5 |
| 2 | 160.5 | 154.0 |
| 3 | 165.5 | 158.5 |
| | 490.0 | 454.0 |

Calculated on the total amount of sodium monochloroacetate added (3×294 g.=882 g.) and taking into account the small difference in aminoacetic acid content between the solution initially used and the last mother liquor, the yield of aminoacetic acid was about 88%. The crystallized amount of sodium chloride corresponds with 102%, calculated on the amount of chlorine added as chloroacetate.

EXAMPLE III

An equimolar crystal mixture of 78 kg. of sodium chloride and 100 kg. of aminoacetic acid is extracted at 80° C. with 376 kg. of a solution consisting of 86 kg. of sodium chloride, 68 kg. of aminoacetic acid and 222 kg. of water, whereby all the aminoacetic acid and a certain amount of sodium chloride enter into solution. 78 kg. of water are withdrawn from the mixture of undissolved sodium chloride and extracted by evaporation, whereby the amount of sodium chloride entered into solution crystallizes again. 78 kg. of sodium chloride are separate from the extract by filtration at 80° C. and thereafter 78 kg. of water are added to the extract. By cooling to 20° C. 100 kg. of aminoacetic acid crystallize; the crystals are separated from the mother liquor by filtration. This mother liquor consists of 68 kg. of aminoacetic acid, 86 kg. of sodium chloride and 222 kg. of water and, thus, has the same composition as the solution used for the extraction.

This invention may be variously modified and embodied within the scope of the subjoined claims.

What is claimed is:

1. A method for preparing an α-aminocarboxylic acid from the corresponding α-chlorocarboxylic acid comprising the steps of:

gradually and simultaneously adding about one half of a predetermined molar quantity of an α-chlorocarboxylic acid and ammonia in a molar ratio of about 1:2 to an aqueous reaction medium recovered from a previous cycle of steps and containing hexamethylenetetramine, α-aminocarboxylic acid, alkali metal chloride and an ionizable ammonium compound, said compound being present in said aqueous reaction medium in a molar amount of at least one fifth of said predetermined molar quantity of α-chlorocarboxylic acid, gradually and simultaneously adding the other half of said predetermined quantity of α-chlorocarboxylic acid and an alkali metal hydroxide in a molar ratio of about 1:2 to said aqueous reaction medium, effecting crystallization of α-aminocarboxylic acid and alkali metal chloride formed during the reaction, and separating a crystal mixture of α-aminocarboxylic acid and alkali metal chloride from the liquid phase containing hexamethylenetetramine, α-aminocarboxylic acid, alkali metal chloride and said ionizable ammonium compound.

2. In a method for preparing an α-aminocarboxylic acid from an alkali metal salt of the corresponding α-chlorocarboxylic acid and ammonia by reacting substantially equimolar predetermined quantites of both reactants in an aqueous medium containing hexamethylenetetramine, the improvement which comprises effecting the reaction in an aqueous medium containing, in addition to hexamethylenetetramine, an ionizable ammonium compound in a molar amount of at least one tenth of the predetermined quantity of the salt of α-chlorocarboxylic acid to be converted in said aqueous medium.

3. The method as defined in claim 1 wherein the molar amount of said ionizable ammonium compound present in said aqueous reaction medium is at least one fifth of said predetermined quantity of the salt of α-chlorocarboxylic acid.

References Cited

UNITED STATES PATENTS

| | | | |
|---|---|---|---|
| 3,190,914 | 6/1965 | Williams | 260—534 |
| 3,215,736 | 11/1965 | Guinot | 260—534 |

LORRAINE A. WEINBERGER, Primary Examiner

A. P. HALLUIN, Assistant Examiner

UNITED STATES PATENT OFFICE
CERTIFICATE OF CORRECTION

Patent No. 3,475,489                              October 28, 1969

Johannes de Graaf et al.

It is certified that error appears in the above identified patent and that said Letters Patent are hereby corrected as shown below:

Column 6, line 15, claim reference numeral "1" should read -- 2 --.

Signed and sealed this 27th day of October 1970.

(SEAL)
Attest:

Edward M. Fletcher, Jr.                      WILLIAM E. SCHUYLER, JR.
Attesting Officer                               Commissioner of Patents